United States Patent
Azuma (10) Patent No.: US 8,280,452 B2
(45) Date of Patent: *Oct. 2, 2012

(54) IN-VEHICLE APPARATUS HAVING HANDSFREE FUNCTION

(75) Inventor: Kazuyoshi Azuma, Kariya (JP)

(73) Assignee: Denso Corporation, Kariya (JP)

( * ) Notice: Subject to any disclaimer, the term of this patent is extended or adjusted under 35 U.S.C. 154(b) by 218 days.

This patent is subject to a terminal disclaimer.

(21) Appl. No.: 12/592,781

(22) Filed: Dec. 2, 2009

(65) Prior Publication Data

US 2010/0144400 A1 Jun. 10, 2010

(30) Foreign Application Priority Data

Dec. 4, 2008 (JP) ................................. 2008-309654

(51) Int. Cl.
*H04M 1/00* (2006.01)
*H04M 11/00* (2006.01)
(52) U.S. Cl. .................................. 455/569.2; 379/88.16
(58) Field of Classification Search ............... 455/569.1, 455/569, 41.2, 41.3; 379/88.16, 211.01
See application file for complete search history.

(56) References Cited

U.S. PATENT DOCUMENTS

| | | | |
|---|---|---|---|
| 6,993,367 B2 | 1/2006 | Yamato et al. | |
| 7,424,288 B2 | 9/2008 | Jung et al. | |
| 7,519,399 B2 | 4/2009 | Suzuki | |
| 2004/0151285 A1* | 8/2004 | Sychta | 379/88.16 |
| 2006/0052141 A1 | 3/2006 | Suzuki | |
| 2007/0026904 A1 | 2/2007 | Matsuda | |
| 2007/0135175 A1 | 6/2007 | Matsuda | |
| 2008/0039153 A1 | 2/2008 | Katoh et al. | |
| 2008/0051156 A1* | 2/2008 | Matsuda | 455/569.2 |
| 2008/0125186 A1* | 5/2008 | Chen et al. | 455/569.1 |
| 2008/0261524 A1 | 10/2008 | Grunshkevich | |
| 2009/0209297 A1 | 8/2009 | Suzuki | |
| 2010/0144401 A1* | 6/2010 | Azuma | 455/569.2 |

FOREIGN PATENT DOCUMENTS

| | | |
|---|---|---|
| JE | 2003-218996 | 7/2003 |
| JP | 11-262041 | 9/1999 |
| JP | 2005-260451 | 9/2005 |

(Continued)

OTHER PUBLICATIONS

Office action dated Oct. 26, 2010 in corresponding Japanese Application No. 2008-309654.

(Continued)

*Primary Examiner* — Kent Chang
*Assistant Examiner* — Kuo Woo
(74) *Attorney, Agent, or Firm* — Harness, Dickey & Pierce, PLC (57) ABSTRACT

An in-vehicle apparatus having a handsfree function is disclosed. The in-vehicle apparatus is connectable with multiple cellular phones at a same time using a handsfree communication protocol. When a first cellular phone and a second cellular phone of the multiple cellular phones are respectively and simultaneously in a handset communicating state and in a calling state, the in-vehicle apparatus does not display a transfer switch for the first cellular phone and displays an answer switch for the second cellular phone, the transfer switch for the first cellular phone being user operable to switch the first cellular phone from the handset communicating state into a handsfree communicating state, the answer switch for the second cellular phone being user operable to switch the second cellular phone from the calling state into the handsfree communicating state.

2 Claims, 6 Drawing Sheets

FOREIGN PATENT DOCUMENTS

| | | |
|---|---|---|
| JP | 2005-286553 | 10/2005 |
| JP | 2006-080617 | 3/2006 |
| JP | 2006-094477 | 4/2006 |
| JP | 2007-36678 | 2/2007 |
| JP | 2007-036678 | 2/2007 |
| JP | 2007-104343 | 4/2007 |
| JP | 2008-042717 | 2/2008 |
| JP | 2008-053805 | 3/2008 |

OTHER PUBLICATIONS

Office Action dated Mar. 29, 2012 issued in co-pending U.S. Appl. No. 12/592,782.

Office Action dated Oct. 26, 2011 issued in co-pending U.S. Appl. No. 12/592,782.

* cited by examiner

IN-VEHICLE APPARATUS HAVING HANDSFREE FUNCTION

CROSS REFERENCE TO RELATED APPLICATION

The present application is based on Japanese Patent Application No. 2008-309654 filed on Dec. 4, 2008, disclosure of which is incorporated herein by reference.

BACKGROUND OF THE INVENTION

1. Field of the Invention

The present invention relates to an in-vehicle apparatus having a handsfree function, and more particularly to an in-vehicle apparatus that is capable of establishing connections to multiple cellular phones at the same time using a handsfree communication protocol for handsfree communication.

2. Description of Related Art

There is known an in-vehicle handsfree apparatus supporting a Bluetooth (registered trademark, referred to also as BT) communication function. According to a known configuration, when a cellular phone supporting a BT communication function is carried into a compartment of a vehicle equipped with the in-vehicle handsfree apparatus, the cellular phone and the in-vehicle handsfree apparatus become communicable with each other via a BT communication link and are connected with each other using a handsfree profile (HFP) defined in BT communications standards for handsfree communications. JP-2003-218996A discloses a configuration for establishing connections (so called multi-connections) between an in-vehicle handsfree apparatus and multiple cellular phones at the same time using the HFP.

When the in-vehicle handsfree apparatus is connected with multiple cellular phones at the same time using HFP, a possible situation is that a first cellular phone of the multiple cellular phones receives an incoming call while a second cellular phone of the multiple cellular phones is in a handsfree communicating state. Taking into consideration the above situation, the assignee company of the present application had filed the patent application JP-2009-224984A (corresponding to US-2009-0209297A) to disclose a method of putting the second cellular phone being in the handsfree communicating state on hold and then switching the first cellular phone receiving the incoming call into the handsfree communicating state.

When an in-vehicle handsfree apparatus is connected with multiple cellular phones using HFP, a user can perform communications in a handsfree communicating state or a handset communicating state. In the handsfree communicating state, the user performs the communications using a microphone and a speaker of the in-vehicle handsfree apparatus. In the handset communicating state, the user performs the communications using a microphone and a speaker of the cellular phone. The inventor of the present application considers that a user may select the handsfree communicating state when the user does not take care of a passenger listening to content of the call, and a user may select the handset communicating state when the user would like a passenger not to listen to content of the call.

Although JP-2009-224984A (corresponding to US-2009-0209297A) addresses a situation where a first cellular phone receives an incoming call while a second cellular phone is in a handsfree communicating state, JP-2009-224984A (corresponding to US-2009-0209297A) addresses nothing about a situation where a first cellular phone receives an incoming call while a second cellular phone is in a handset communicating state. The inventor of the present application considers that it is necessary to provide a way for a user to properly deal with a situation in which: multiple cellular phones are connected with the in-vehicle handsfree apparatus at the same; and a first cellular phone of the multiple cellular phones receives an incoming call while a second cellular phone of the multiple cellular phones is in a handset communicating state. The inventor of the present application further considers that, although one way to deal with the above-described situation is to allow a user to manipulate both of the first cellular phone receiving an incoming call and the second cellular hone in a handset communicating state, this way may not be appropriate because user operation becomes complicated.

SUMMARY OF THE INVENTION

In view of the above and other difficulties, it is an objective of the present invention to provide an in-vehicle apparatus having a handsfree function, the in-vehicle apparatus enabling a user to properly deal with a situation in which one of multiple cellular phones connected with the in-vehicle apparatus receives an incoming call while another one of the multiple cellular phones is in a handset communicating state.

According to an aspect of the present invention, an in-vehicle apparatus having a handsfree function is provided. The in-vehicle apparatus is configured to establish connection with a plurality of cellular phones at a same time using a handsfree communication protocol for handsfree communication. Each cellular phone is configured to operable in a calling state when the each cellular phone is receiving an incoming call. Further, each cellular phone is configured to be selectively operable in one of a handsfree communicating state and a handset communicating state. In the handsfree communicating state, a voice path between the each cellular phone and the connection section is open so that a first outgoing voice inputted via a voice input device of the in-vehicle apparatus is transmitted toward a party and a first incoming voice transmitted from the party is output by a voice output device of the in-vehicle apparatus. In the handset communicating state, the voice path between the each cellular phone and the connection section is closed so that a second outgoing voice inputted via a voice input part of the each cellular phone is transmitted to toward the party and, a second incoming voice transmitted from the party is outputted by a voice output part of the each cellular phone. The in-vehicle apparatus is configured to provide a transfer item and an answer item. The transfer item is user operable to switch a first cellular phone from the handset communicating state into the handsfree communicating state, the first cellular phone being one of the cellular phones connected with the connection section and being in the handset communicating state. The answer item is user operable to switch a second cellular phone from the calling state into the handsfree communication so that response to the incoming call of the second cellular hone is performed in the handsfree communication, the second cellular phone being another one of the cellular phones connected with the connection section and being in the calling state. The in-vehicle apparatus is further configured to prohibit the transfer item for the first cellular phone from being provided and allow the answer item for the second cellular phone to be provided if the first cellular phone and the second cellular phone are respectively and simultaneously in the handset communicating state and in the calling state.

According to the above in-vehicle apparatus, without operating the first cellular phone being in the handset communicating state, a user can select to whether to answer the incoming call of the second cellular phone being in the calling state by operating the answer item for the second cellular phone, and thereby can perform handsfree communication with a calling party of the incoming call of the second cellular phone. Since an operation on the first cellular phone being in the private communicating state is in part restricted while an operation on the second cellular phone 3b being in the calling state is not restricted. The in-vehicle apparatus enables a user to properly deal with a situation in which: of multiple cellular phones connected with the in-vehicle apparatus, the first cellular phone receives an incoming call while the second cellular phone is being in the handset communication state.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EXEMPLARY EMBODIMENTS

The exemplary embodiments are described below with reference to the accompanying drawings.

In the following explanation, it is assumed that two cellular phones each having a BT communication function are carried into a vehicle compartment of a vehicle equipped with a BT-supporting in-vehicle handsfree apparatus having a BT communication function. Further, the in-vehicle handsfree apparatus is communicatable with the two cellular phones via a BT communication link. The in-vehicle handsfree apparatus is an example of an in-vehicle apparatus having a handsfree function.

Figure 1:
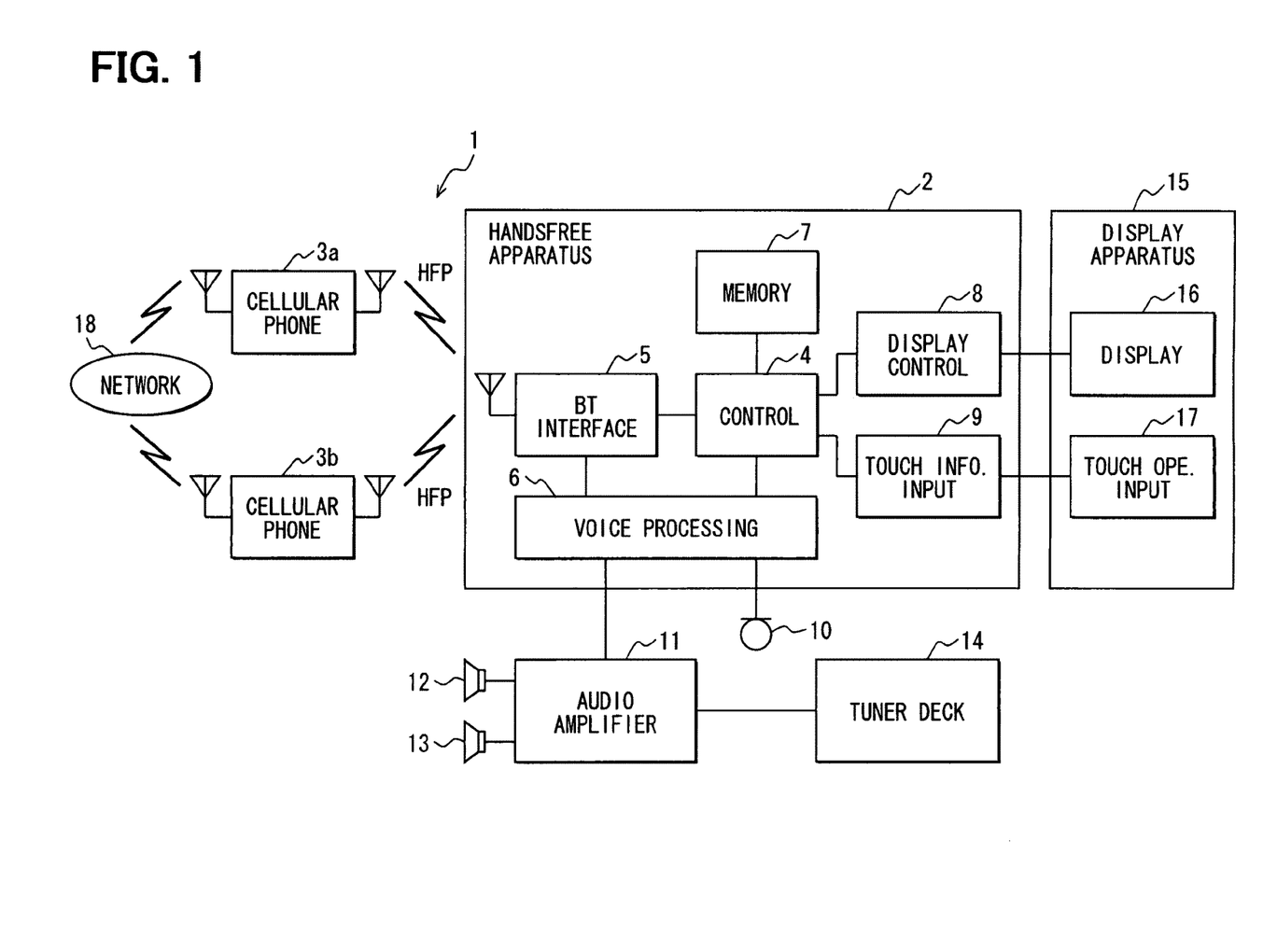
FIG. 1 is a block diagram illustrating an in-vehicle handsfree apparatus according to one embodiment.

A handsfree system 1 includes an in-vehicle handsfree apparatus 2 and two cellular phones 3a, 3b. The in-vehicle handsfree apparatus 2 includes a control unit 4 acting as a controller or control means, a BT interface (IF) unit 5 acting as a connection section or means, a communication voice processing unit 6, a memory unit 7, and a display control unit 8 and a touch information input unit 9.

The control unit 4 includes a microcomputer having a CPU, a RAM, a ROM, an I/O bus and the like. The control unit 4 may control generally all of operations of the in-vehicle handsfree apparatus 2, the operations including a communications operation, a data management operation and the like. The BT interface unit 5 has a function to perform BT communications with the cellular phone 3a, 3b and supports a handsfree profile (HFP: referred to also as a handsfree communication protocol) for providing handsfree communication defined in communication standards of BT. The BT interface unit 5 is configured to be capable of establishing connections (so called multi-connection) with multiple cellular phones 3a, 3b using HFP at the same time. In addition to the HFP, the BT interface unit 5 supports a phone book access profile (PBAP), an object push profile (OPP), a message access profile (MAP) and the like. The PBAP is used for transferring data such as phonebook data, outgoing call history data, incoming call history data and the like. The OPP is used for transferring a variety of data. The MAP is used for mail-forwarding. The above profiles correspond to communication protocols defined based on respective functions thereof.

The communication voice processing unit 6 is connected with a microphone 10. Such microphone 10 can act as a voice input device of a side of the in-vehicle apparatus having a handsfree function, or a voice input device of the in-vehicle apparatus having a handsfree function. The microphone 10 may be different from a microphone of the cellular phones 3a, 3b, and may receive sound for the in-vehicle handsfree apparatus 2. The microphone 10 is arranged in a vehicle compartment and is located at a place where efficient collection of user voice is possible. For example, the microphone 10 is located proximal to a steering wheel. The communication voice processing unit 6 is connected with an audio amplifier 11: The audio amplifier 11 is external with respect to the in-vehicle handsfree apparatus 2 and is connected with two speakers 12, 13. Such speakers 12, 13 can act as a voice output device of a side of the in-vehicle apparatus having a handsfree function, or a voice output device of the in-vehicle apparatus having a handsfree function. The speakers 12, 13 may be different from a speaker of the cellular phones 3a, 3b, and may output sound for the in-vehicle handsfree apparatus 2. The speakers 12 and 13 are arranged symmetric to each other with respect to an axis of symmetry that extends in a longitudinal direction of the vehicle. For example, the speakers 12 and 13 are respectively mounted to a driver side door and a front passenger side door. The audio amplifier 11 is connected with a tuner deck 14. When the tuner deck 14 inputs an audio signal to the audio amplifier 11, the audio amplifier 11 amplifies the audio signal to output audio content of the audio signal from the speakers 12 and 13. The audio content may be music read from a storage medium for music, a radio program received from a radio station or the like.

The memory unit 7 can store therein a variety of data such as phone book data, outgoing call history data, incoming call history data and the like. The phone book data specifies a relationship between a telephone number and a registered name. The outgoing call history data specifies a relationship between outgoing time (i.e., time of origin) and an outgoing telephone number. The outgoing time and the outgoing telephone number are related to an operation (transmission) associated with an outgoing call from the in-vehicle handsfree apparatus 2 or related to an operation associated with an outgoing call from the cellular phone 3a, 3 connected with the in-vehicle handsfree apparatus 2 via the HFP. The incoming call history data specifies a relationship between incoming time and an incoming telephone number. The incoming time and the incoming telephone number are related to an operation (reception) associated with an incoming call of the cellular phone 3a, 3b connected with the in-vehicle handsfree apparatus 2 via the HFP.

A display apparatus 15 includes a display unit 16 for displaying a variety of displays (e.g., display window) and a touch operation input unit 17 for providing or forming a touch switch on the display. When a display instruction signal is inputted to the display control unit 8 from the control unit 4, the display control unit 8 controls a display operation of the display unit 16 based on the display instruction signal. When the touch information input unit 9 receives an operation detection signal from the touch operation input unit 17 in response to user operation manipulation of the touch switch on the display window, the touch information input unit 9 outputs the operation detection signal to the control unit 4, and the control unit 4 analyzes the operation detection signal.

Each cellular phone 3a, 3b has a telecommunication function. The cellular phone 3a, 3b includes: a control part for controlling generally all of operations of the cellular phone; a telecommunication part for performing telecommunications via a communication network; a BT interface part for performing BT communications; a key part having various keys arranged thereon to be manipulated by a user, a memory part for storing therein various data, e.g., phone book data specifying a relationship between a phone number and a registered name; a display part for displaying various images; a microphone for receiving and inputting user voice; and a speaker for outputting incoming voice based on a voice signal received from a calling party. Because of the above configuration, the BT interface part of the cellular phone 3a, 3b has a function to perform BT communications with the in-vehicle handsfree apparatus 2. As the BT interface unit 5 of the in-vehicle handsfree apparatus 2 does, the BT interface part of the cellular phone 3a, 3b supports HFP and is configured to establish connection with the in-vehicle handsfree apparatus 2 via HFP. The microphone of the cellular phone is an, example of a voice input part of the cellular phone. The speaker of the cellular phone is an example of a voice output part of the cellular phone.

Explanation is given below on a case where a cellular phone 3, which refers to one of the cellular phones 3a and 3b, is connected with the in-vehicle handsfree apparatus 2 via HFP, and the cellular phone 3 receives an incoming call via the communication network. In one embodiment, the communication network 18 includes an apparatus for providing cellular phone communication service, such as a cellular phone base station, a base station control apparatus and the like.

When the cellular phone 3 detects receiving an incoming call via the communication network while establishing the connection with the in-vehicle handsfree apparatus 2 using HFP, the cellular phone 3 transmits an incoming call reception signal to the in-vehicle handsfree apparatus 2. The incoming call reception signal contains information indicating that the cellular phone 3 is receiving incoming call and is thus in a calling state. Further, the incoming call reception signal contains identification information (e.g., a registered phone number of the cellular phone 3) for identification of the cellular phone 3 receiving the incoming call. Further, when a phone number of a calling party is received via the communication network, the incoming call reception signal may further contain information on the phone number of a calling party. Further, when the cellular phone 3 supports in-band ringtone, the cellular phone 3 may transmit a ringtone registered in the cellular phone 3 to the in-vehicle handsfree apparatus 2.

When the control unit 4 of the in-vehicle handsfree apparatus 2 receives the incoming call reception signal from the cellular phone 3 via the BT interface unit 5, and when the control unit 4 does not receive the ringtone from the cellular phone 3, the control unit 4 causes the speakers 12, 13 to output a ringtone registered in the in-vehicle handsfree apparatus 2, thereby notifying a use of the receiving of the incoming call. When the control unit 4 receives the ringtone from the cellular phone 3, the control unit 4 causes the speakers 12, 13 to output a ringtone that is substantially identical to that registered in the cellular phone 3. Further, the control unit 4 causes the display unit 16 to display a calling state notice window indicative of the receiving of the incoming call, thereby further notifying a user that the cellular phone 3 is receiving the incoming call.

Because of the above-described operation, a user can recognize the incoming call reception in the cellular phone 3 by hearing the ringtone outputted from the speakers 12, 13 or viewing the calling state notice window displayed by the display unit 16. When a user recognizes that the cellular phone 3 is receiving the incoming call, the user can select, by operating the in-vehicle handsfree apparatus 2, whether to answer or reject the incoming call of the cellular phone 3 in the handsfree communication. Further, the user can select, by operating the cellular phone 3, whether to answer or reject the incoming call of the cellular phone 3 in private communication (i.e., the handset communication). In the above, the handsfree communication is performed using the microphone 10 and the speakers 12, 13 of the side of the in-vehicle handsfree apparatus. The handsfree communication is thus performed in a condition where a voice path between the cellular phone 3 and the in-vehicle handsfree apparatus is open to transmit and receive voice between the cellular phone 3 and the in-vehicle handsfree apparatus 2. The private communication is performed using the microphone and the speaker of the cellular phone 3 in a condition where the voice path between the cellular phone 3 and the in-vehicle handsfree apparatus 2 is closed so that the voice is not transmitted and received between the cellular phone 3 and the in-vehicle handsfree apparatus 2.

Figure 2:
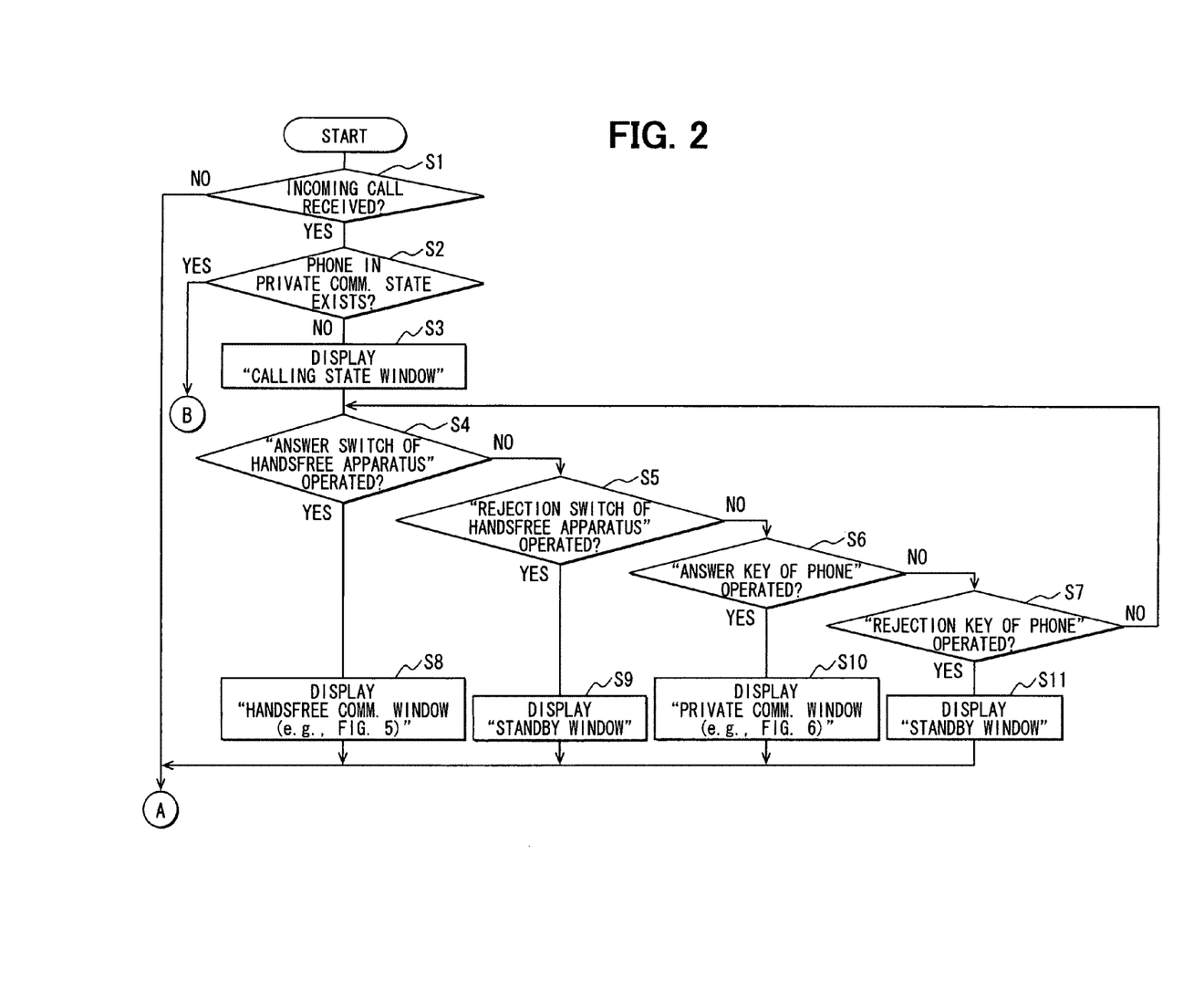
FIGS. 2 and 3 are flowchart illustrating an incoming call detection procedure performed by an in-vehicle handsfree apparatus.
Figure 3:
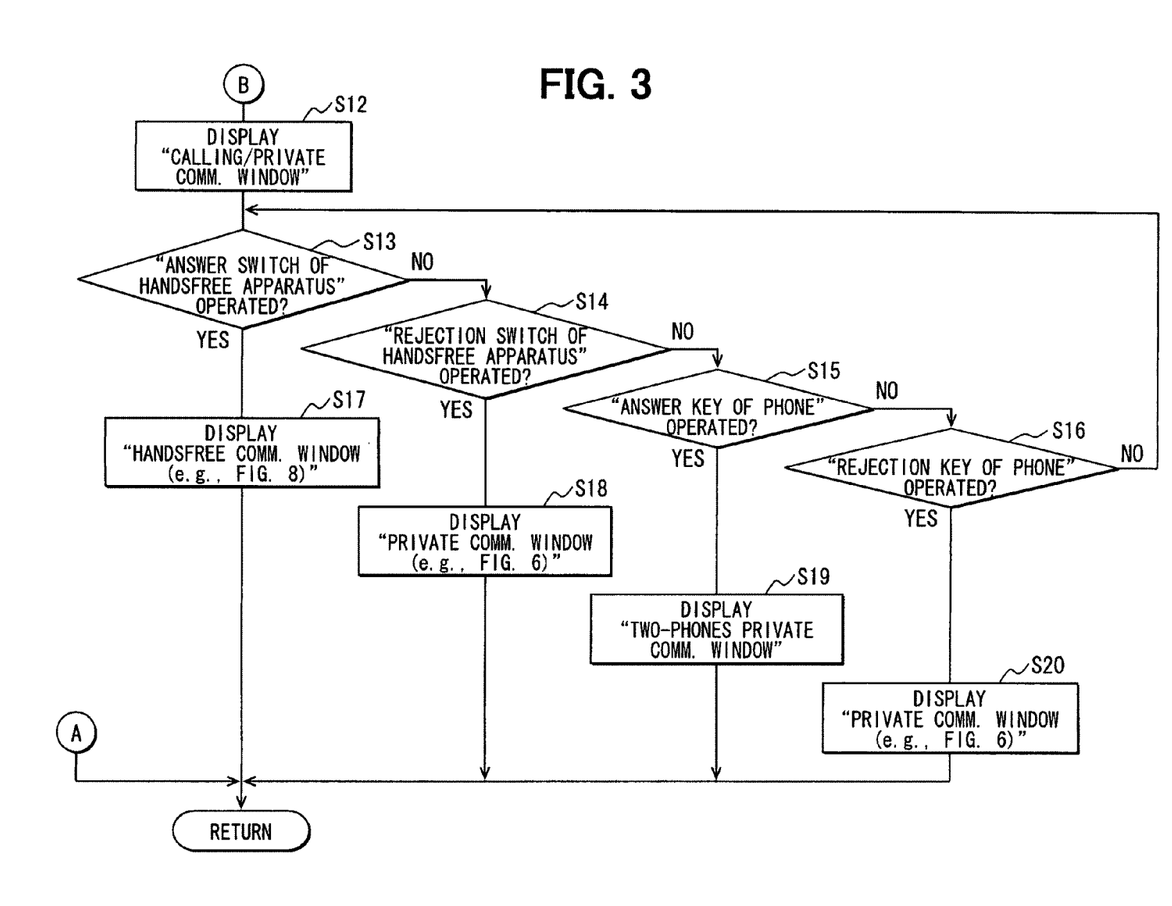

With reference to FIGS. 2 to 8, explanation is give below on operation of the in-vehicle handsfree apparatus 2. FIGS. 2 and 3 are flowcharts illustrating an incoming call detection procedure, which the in-vehicle handsfree apparatus 2 performs. At S1, the control unit 4 of the in-vehicle handsfree apparatus 2 determines whether the cellular phone receives an incoming call via the communication network. When it is determined that the cellular phone 3 is not receiving an incoming call, corresponding to "NO" at S1, the incoming call procedure is ended, and the process returns to another procedure, which is for example a main procedure.

When it is determined that the cellular phone 3 is receiving an incoming call, corresponding to "YES" at S1, the process proceeds to S2. At S2, the control unit 4 determines whether a cellular phone 3 different from the cellular phone 3 receiving the incoming call is in use for the private communication. When it is determined that there is no cellular phone 3 being in use for the private communication, the process proceeds to S3. At S3, the control unit 4 causes the display unit 16 to display a calling state notice window indicating that the cellular phone 3 is receiving the incoming call, by, for example, switching the display from a standby window into the calling state notice window, because the display may be the standby window prior to the incoming call reception in the cellular phone 3.

Figure 4:
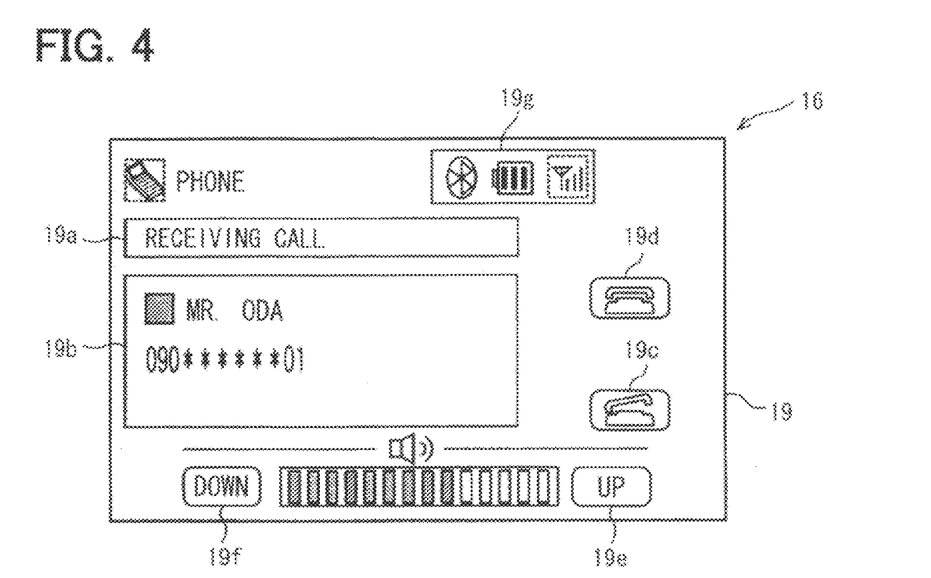
FIG. 4 is a diagram illustrating a calling state notice window.

For example, the control unit 4 causes the display unit 16 to display the calling state notice window illustrated in FIG. 4 in the following situation: the in-vehicle handsfree apparatus 2 and the cellular phones 3a, 3b are connected with each other using the HFP; one cellular phone 3a is in the standby state and another cellular phone receives an incoming call via communication network from a calling party whose phone number is "090***01"; and the control unit 4 receives an incoming call reception signal from the cellular phone 3b via the BT interface unit 5. FIG. 4 illustrates the calling state notice display for a case where the in-vehicle handsfree apparatus 2 receives "090**01" as a phone number of the calling party from the cellular phone 3b**, and the phone book date stores therein a name "MR. Oda" as a registered name corresponding to the phone number of the calling party.

The control unit 4 causes the display unit 16 to display "receiving an incoming call", "ringing" or the like on a state display part 19a of the calling state notice window 19 to indicate the incoming call reception. Further, the control unit 4 causes the display unit 16 to display information on the calling party such as "090***01", "Mr. Oda" and the like on a calling party information display part 19b of the calling state notice window 19. Further, the control unit 4 causes the display unit 16 to form and display an answer switch 19c, a rejection switch 19d, a volume up switch 19e and a volume down switch 19f. The answer switch 19c is user operable to answer the incoming call. The rejection switch 19d is user operable to reject the incoming call. The volume up switch 19e and the volume down switch 19f are user operable to turn up and down the volume on the speakers 12, 13. Further, the control unit 4 causes the display unit 16 to display a remaining battery level image and a reception quality image on a phone state display part 19g. The remaining battery level image indicates a remaining battery level, information on which is transmitted from the cellular phone 3b, of the cellular phone 3b receiving the incoming call. The reception quality image indicates the reception quality of the cellular phone 3**.

When the cellular phone 3b is receiving an incoming call, a user may answer the incoming call in a handsfree communicating state by operating the answer switch 19c on the calling state notice window 19. Alternatively, a user may reject the incoming call by operating the rejection switch 19d on the calling state notice window 19. Alternatively, a user may answer the incoming call in the private communicating state by operating the answer key of the cellular phone 3b. Alternatively, a user may reject the incoming call by operating the rejection key of the cellular phone 3b.

After the display unit 16 displays the calling state notice window 19, the process proceeds to S4. At S4, the control unit 4 determines whether operation on the answer switch 19c is made by a user. At S5, the control unit determines whether operation on the rejection switch 19d is made by a user. At S6, the control unit 4 determines whether operation on the answer key of the cellular phone 3b is made by a user. At S7, the control unit 4 determines whether operation on the rejection key of the cellular phone 3b is made by a user.

When it is determined that a user has operated the answer switch 19c on the calling state notice window 19, corresponding to "YES" at S4, the process proceeds to S8. At S8, the control unit 4 causes the cellular phone 3b to perform an operation for answering the incoming call. Further the control unit 4 opens a voice path between the BT interface unit 5 and the cellular phone 3b. Further, after the cellular phone 3b switches from an calling state into the handsfree communicating state, the control unit 4 switches the display of the display unit 16 from the calling state notice window 19 illustrated in FIG. 4 into a handsfree communicating state notice window 20 illustrated in FIG. 5 to indicate that the handsfree communication is being performed.

Figure 5:
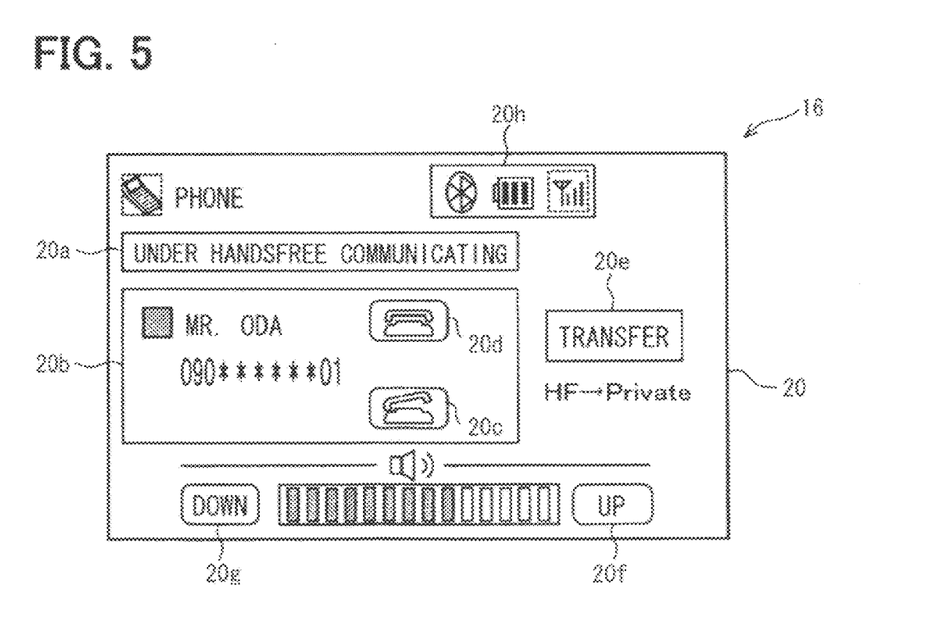
FIG. 5 is a diagram illustrating a handsfree communicating state notice window.

On a state display part 20a of the handsfree communicating state notice window 20, the control unit 4 displays "under handsfree communication" indicating that the handsfree communication is being performed. Further, the control unit 4 displays the calling party information such as "090***01", "MR. Oda" and the like on a calling party information display part 20b. Further, the control unit 4 displays a hold switch 20c, a hang up switch 20d, a transfer switch 20e, a volume up switch 20f and a volume down switch 20g. The hold switch 20c is user operable to hold the handsfree communication. The hang up switch 20d is user operable to hang up the handsfree communication. The transfer switch 20e can act as a transfer item or means, and is user operable to switch or transfer the communication way from the handsfree communication to the private communication. The volume up switch 20f and the volume downs switch 20g are user operable to turn up and down the volume on the speakers 12, 13. Further, the control unit 4 displays a remaining battery level image and a reception quality image on a phone state display part 20h. The remaining battery level image indicates a remaining battery level, information on which is transmitted from the cellular phone 3b, of the cellular phone 3b receiving the incoming call. The reception quality image indicates the reception quality of the cellular phone 3b**.

When it is determined at S5 that a user has operated the rejection switch 19d on the calling state notice window 19, corresponding to "YES" at S5, the process proceeds to S9. At S9, the control unit 4 causes the cellular phone 3b to perform an operation for rejecting the incoming call. Further, after the cellular phone 3b switches into the standby state, the control unit 4 switches the display of the display unit 16 from the calling state notice window 19 into the standby window indicative of the standby state.

When the control unit 4 receives a state notification from the cellular phone 3b and determines that a user has operated the answer key of the cellular phone 3b, corresponding to "YES" at S6, the process proceeds to S10. At S10, the control unit 4 causes the cellular phone 3b to perform an operation for answering the incoming call. Further, the control unit 4 does not open a voice path between the BT interface unit 5 and the cellular phone 3b. Further, after the cellular phone 3b switches from the calling state into a private communicating state, the control unit 4 switches the display of the display unit 16 from the calling state notice window 19 illustrated in FIG. 4 into a private communicating state notice window illustrated in FIG. 6 to indicate that the private communication is being performed.

Figure 6:
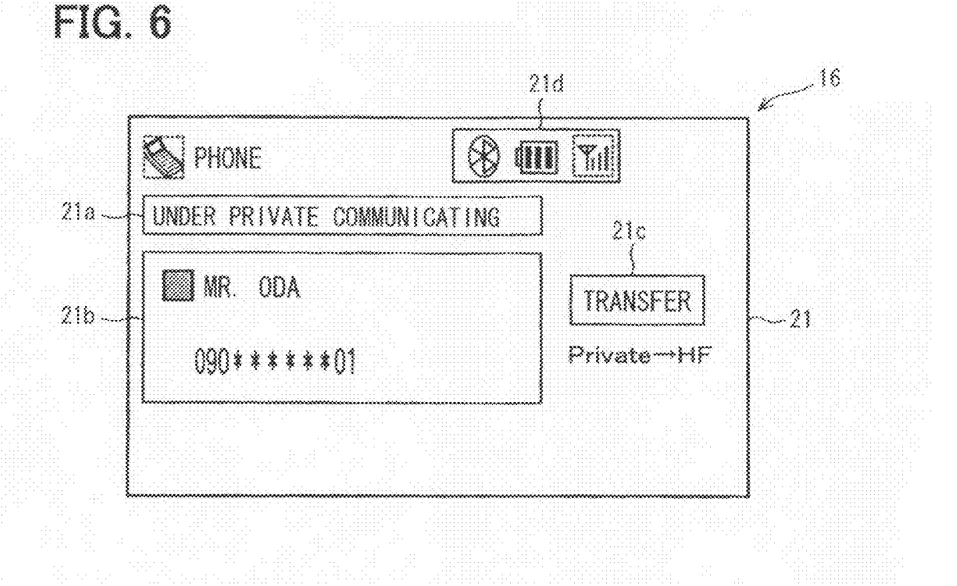
FIG. 6 is a diagram illustrating a private communicating state notice window.

The control unit 4 displays "under private communication", which indicates that the private communication is being performed, on a state display part 21a of the private communicating notice window 21. Further, the control unit 4 displays information on the calling party such as "090***01", "Mr. Oda" and the like on a calling party information display part 21b. Further, the control unit 4 displays a transfer switch 21c, which is user operable to switch from the private communication into the handsfree communication. Further, the control unit 4 displays a remaining battery level image and a reception quality image on a phone state display part 21d. The remaining battery level image indicates a remaining battery level, information on which is transmitted from the cellular phone 3b, of the cellular phone 3b receiving the incoming call. The reception quality image indicates the reception quality of the cellular phone 3b**.

When the control unit 4 receives a state notification from the cellular phone 3b and determines that a user has operated the rejection key of the cellular phone 3b, corresponding to "YES" at S7, the process proceeds to S11. At S11, the control unit 4 causes the cellular phone 3b to perform an operation for rejecting the incoming call. Further, after the cellular phone 3b switches into the standby state, the control unit 4 switches the display of the display unit 16 from the calling state notice window 19 illustrated in FIG. 4, into the standby window indicative of the standby state.

When the control unit 4 at S2 determines that one cellular phone 3 receives an incoming call via the communication network 18 at a time when the private communication is being performed with another cellular phone 3, corresponding to "YES" at S2, the process proceeds to S12. In the above, the private communicating state notice window is displayed prior to the receiving of the incoming call in the cellular phone 3. Thus, at S12, the control unit 4 switches the display of the display unit 16 from the private communicating state notice window into a calling/private communicating state notice window, which indicates that the cellular phone 3 receives an incoming call when the private communication is being performed with another cellular phone 3.

Figure 7:
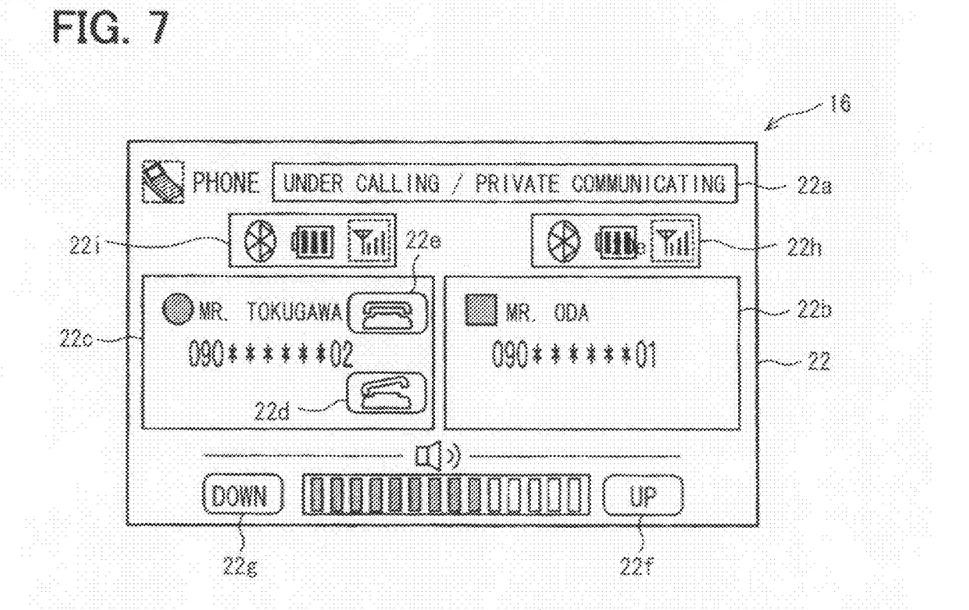
FIG. 7 is a diagram illustrating a calling/private communicating state notice window.
Figure 8:
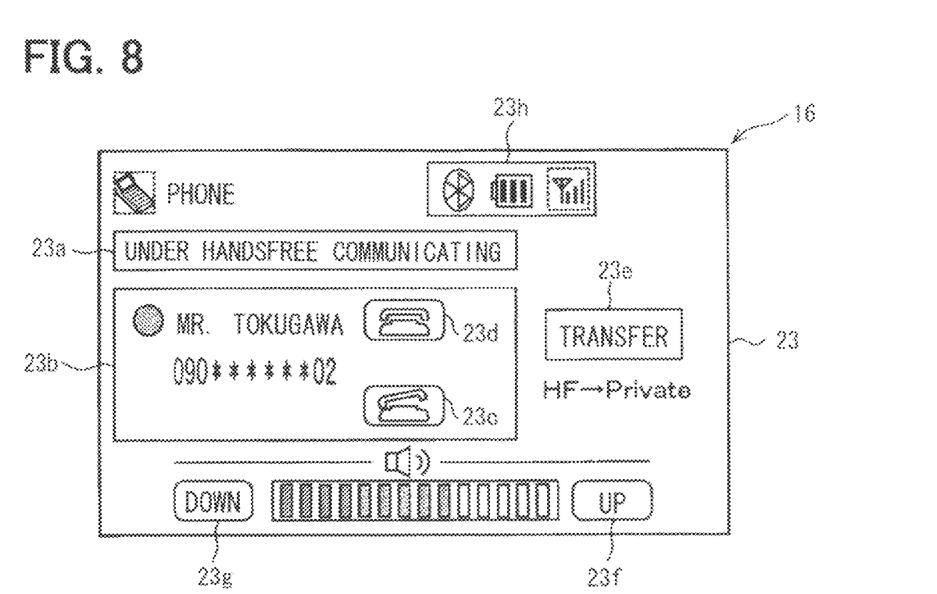
FIG. 8 is a diagram illustrating another example of the handsfree communicating state notice window.

Explanation is given below on an exemplary case in which: the in-vehicle handsfree apparatus 2 is connected with the cellular phones 3a, 3b via HFP; and one cellular phone 3b receives an incoming call via the communication network 18 from a calling party with a caller number "090***02" when the private communication is being performed with another cellular phone 3a. When the control unit 4 receives an incoming call reception notification signal via the BT interface unit 5 from the cellular phone 3b, the control unit 4 displays the calling/private communicating state notice window 22 illustrated in FIG. 7 on the display unit 16. FIG. 7 illustrate a case where the control unit 4 receives "090*02" as the caller number from the cellular phone 3**b receiving the incoming call, and the phone book data stores therein "Mr. Tokugawa" as a registered name corresponding to the caller number.

The control unit 4 displays "under calling/private communication" on a state display part 22a of the calling/private communicating state notice window 22 to indicate the receiving of the incoming call and the performing of the private communication. Further, the control unit 4 displays information on the calling party of the private communication such as "090***01", "Mr. Oda" and the like on a calling party information display part 22b. Further, the control unit 4 displays information on the calling party of the incoming call such as "090*02", "Mr. Tokugawa" and the like on a calling party information display part 22c. Further, the control unit 4 causes the display unit 16 to display an answer switch 22d acting as an answer item or means, a rejection switch 22e acting as a rejection item or means, a volume up switch 22f and a volume down switch 22g. The answer switch 22d is user operable to answer the incoming call. The rejection switch 22e is user operable to reject the incoming call. The volume up switch 22f and the volume down switch 22g are user operable to turn up and down the volume on the speakers 12, 13. Further, the control unit 4 displays a remaining battery level image and a reception quality image on a phone state display part 22h as information on the cellular phone 3a. The remaining battery level image indicates a remaining battery level, which is transmitted from the cellular phone 3a, of the cellular phone 3a. The reception quality image indicates the reception quality of the cellular phone 3a. Further, the control unit 4 displays a remaining battery level image and a reception quality image on a phone state display part 22i as information on the cellular phone 3b. The remaining battery level image indicates a remaining battery level, which is transmitted from the cellular phone 3b, of the cellular phone 3b. The reception quality image indicates the reception quality of the cellular phone 3b. It should be noted that a user operable transfer switch for a user to switch communication manner from the private communication into the handsfree communication is not displayed on the calling/private communicating state notice window by the control unit 4**.

Due to the above manners, when the cellular phones 3a is in the private communicating state and when the cellular phone 3b is in the calling state, a user may operate the answer switch 22d on the calling/private communicating state notice window 22, and thereby can answer the incoming call of the cellular phone 3b in the handsfree communication. Alternatively, a user may operate the rejection switch 22e on the calling/private communicating state notice window 22, and thereby can reject the incoming call of the cellular phone 3b. Alternatively, a user may operate the answer key of the cellular phone 3b, and thereby can answer the incoming call of the cellular phone 3b in the private communication. Alternatively, a user may operate the rejection key of the cellular phone 3b, and thereby can reject the incoming call of the cellular phone 3b. In this case, because the transfer switch, which is user-operable to switch from the private communication into the handsfree communication, is not formed, a user cannot switch the cellular phone 3a from the private commutation into the handsfree communication. In other words, although a user can perform an operation directed to the cellular phone 3b (which is in the calling state in this example) via the calling/private communicating state notice window 22, the user cannot perform an operation directed to the cellular phone 3a (which is in the private communicating state in this example).

After S12, the process proceeds to S13. At S13, the control unit 4 determines whether an operation on the answer switch 22d is made by a user. At S14, the control unit 4 determines whether an operation on the rejection switch 22e is made by a user. At S15, the control unit 4 determines whether an operation on the answer key of the cellular phone 3b is made by a user, by receiving a state notification from the cellular phone 3b. At S16, the control unit 4 determines whether an operation on the rejection key of the cellular phone 3b is made by a user, by receiving a state notification from the cellular phone 3b.

When it is determined at S13 that a user has operated the answer switch 22d on the calling/private communicating state notice window 22, corresponding to "YES" at S13, the process proceeds to S17. At S17, the control unit 4 causes the cellular phone 3b to perform an operation for answering the incoming call. Further, the control unit 4 opens the voice path between the BT interface unit 5 and the cellular phone 3b. Further, after the cellular phone 3b switches from the calling state into the handsfree communicating state, the control unit 4 switches the display of the display unit 16 from the calling/private communicating state notice window 22 illustrated in FIG. 7 into the handsfree communicating state notice window 23 illustrated in FIG. 8, thereby indicating that the cellular phone 3b is involved in the handsfree communication. Display parts 23a, 23b, 23c and switches 23c to 23g on the handsfree communicating state notice window 23 illustrated in FIG. 8 respectively have similar functions as the display parts 20a, 20b, 20h and the switches 20c to 20g on the handsfree communicating state notice window 20 illustrated in FIG. 5 have.

When it is determined at S14 that a user has operated the rejection switch 22e on the calling/private communicating state notice window 22, corresponding to "YES" at S14, the process proceeds to S18. At S18, the control unit 4 causes the cellular phone 3b to perform an operation for rejecting the incoming call. Further, after the cellular phone 3b switches into the standby state, the control unit 4 switches the display of the display unit 16 from the calling/private communicating state notice window 22 illustrated in FIG. 7 into the private communicating notice window 21 illustrated in FIG. 6, so that the display is returns to one that had displayed prior to the receiving of the incoming call in the cellular phone 3b, thereby indicating that the private communication is being performed with the cellular phone 3a.

When, the control unit 4 determines, by receiving a state notification from the cellular phone 3, that a user has operated the answer key of the cellular phone 3b, corresponding to "YES" at S15, the process proceeds to S19. At S19, the control unit 4 causes the cellular phone 3b to perform an operation for answering the incoming call. Further, the control unit 4 does not open the voice path between the BT interface unit 5 and the cellular phone 3b. Further, after the cellular phone 3b switches from the calling state into the private communicating state, the control unit 4 switches the display of the display unit 16 from the calling/private communicating state notice window 22 into a two-phones private communicating notice window indicating that the private communications are being performed with the two cellular phones 3a and 3b.

When the control unit 4 determines, by receiving a state notification from the cellular phone 3b, that a user has operated the rejection key of the cellular phone 3b, corresponding to "YES" at S16, the process proceeds to S20. At S20, the control unit 4 causes the cellular phone 3b to perform an operation for rejecting the incoming call. Further, after the cellular phone 3b switches into the standby state, the control unit 4 switches the display of the display unit 16 from the calling/private communicating state notice window 22 illustrated in FIG. 7 into the private communicating notice window 21 illustrated in FIG. 6, thereby indicating that the private communication is being performed with the cellular phone 3a.

As described above, one embodiment can be configured as follows. Suppose that the cellular phone 3b, which is one of the cellular phones 3a, 3b each connected with the in-vehicle handsfree apparatus 2 using HFP, receives an incoming call while the other cellular phone 3a is in the private communicating state. In this case, the in-vehicle handsfree apparatus 2 does not display the transfer switch for switching the cellular phone 3a from the private communicating state into the handsfree communicating state, while displaying the answer switch 22d for answering the incoming call of the cellular phone 3b and the rejection switch 22e for rejecting the incoming call of the cellular phone 3b.

Thus, without operating the cellular phone 3a being in the private communicating state, a use can perform the following operations; by operating the answer switch 22d, a user can select whether to answer the incoming call of the cellular phone 3b being in the calling state, and thereby can perform the handsfree communication with the calling party of the incoming call of the cellular phone 3b; and a user can select whether to reject the incoming call of the cellular phone 3b by operating the rejection switch 22e. In the above, an operation on the cellular phone 3a being in the private communicating state is in part restricted while an operation on the cellular phone 3b being in the calling state is not restricted. The present embodiment enables a user to properly deal with a situation in which: the cellular phones 3a, 3b are connected with the in-vehicle handsfree apparatus 2 at the same time using HFP; and one cellular phone 3b receives an incoming call while another cellular phone 3a is in the private communicating state.

The above embodiment can be modified in various ways, examples of which are described below.

The in-vehicle handsfree apparatus may be integrated, as a whole or in part, into another in-vehicle apparatus such as an in-vehicle navigation apparatus and the like. The number of cellular phones connected with the in-vehicle handsfree apparatus may be three or more. In such a case, when one cellular phone receives an incoming call via a communication network while two or more cellular phones are respectively in the private communicating states, the in-vehicle handsfree apparatus may not provide a user with the transfer item or means that are respectively associated with the two or more cellular phones being in the private communicating states, whereas the in-vehicle handsfree apparatus may provide a user with the answer item or means and the rejection item or means that are associated with the one cellular phone being in the calling state.

In the above embodiment, the in-vehicle handsfree apparatus causes the display unit to form and display: a transfer switch acting a transfer item or means that is user-operable to switch communication manners from the private communication into the handsfree communication; an answer switch acting as a answer item or means that is user-operable to answer an incoming call; and a rejection switch acting as a rejection item or means that is user-operable to reject an incoming call. Alternatively, the above items or means may be provided as mechanical switches arranged, for example, close to a steering wheel or between a driver seat and a front passenger seat. In the use of mechanical switches, an operation procedure for the above items or means may be displayed by the display unit. A layout of display parts and switches on each notice window may be modified in other layouts.

While the invention has been described above with reference to various embodiments thereof, it is to be understood that the invention is not limited to the above described embodiments and constructions. The invention is intended to cover various modifications and equivalent arrangements. In addition, while the various combinations and configurations described above are contemplated as embodying the invention, other combinations and configurations, including more, less or only a single element, are also contemplated as being within the scope of embodiments.

Further, each or any combination of procedures, processes, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a computer-readable storage media or can be downloaded and installed in a computer via a communications network.

What is claimed is:

1. An in-vehicle apparatus having a handsfree function, comprising:
 a connection section that is configured to establish connection with a plurality of cellular phones at a same time using a handsfree communication protocol for handsfree communication, each cellular phone being configured to be selectable between a handsfree communicating state and a handset communicating state when having the connection with the connection section using the handsfree communication protocol for handsfree communication,
 wherein in the handsfree communicating state, a voice path between the each cellular phone and the connection section is open, so that a voice inputted via a voice input device of the in-vehicle apparatus is transmitted as an outgoing voice to a party and a voice transmitted from the party is outputted as an incoming voice from a voice output device of the in-vehicle apparatus,
 wherein in the handset communicating state, the voice path between the each cellular phone and the connection section is closed, so that the voice inputted via a voice input part of the each cellular phone is transmitted as the outgoing voice to the party and, the voice transmitted from the party is outputted as the incoming voice from a voice output part of the each cellular phone; and a controller that has a function to provide a user with a transfer operation item that is user operable to switch the each cellular phone, which is connected with the connection section using the handsfree communication protocol, from the handset communicating state into the handsfree communicating state, and a function to provide the user with an answer operation item that is user operable to switch the each cellular phone, which is connected with the connection section using the handsfree communication protocol, from an incoming call receiving state, in which the each cellular phone is receiving an incoming call, into the handsfree communication, so that response to the incoming call of the cellular hone is performed in the handsfree communication, wherein the plurality of cellular phones connected with the connection section using the handsfree communication protocol includes a first cellular phone and a second cellular phone, wherein the controller provides the transfer operation item for the first cellular phone to the user when the first cellular phone, which is connected with the connection section using the handsfree communication protocol, is in the handset communicating state and the second cellular phone, which is connected with the connection section using the handsfree communication protocol, is not in the incoming call receiving state, wherein the controller provides the answer operation item for the second cellular phone to the user without providing the transfer operation item for the first cellular phone to the user when the first cellular phone, which is connected with the connection section using the handsfree communication protocol, is in the handset communicating state and the second cellular phone, which is connected with the connection section using the handsfree communication protocol, is in the incoming call receiving state.

2. The in-vehicle apparatus according to claim 1, wherein:

the controller further has a function to provide the user with a rejection operation item that is user operable to reject the incoming call of the each cellular phone that is in the incoming call receiving state and is connected with the connection section using the handsfree communication protocol, and the controller provides the answer operation item and the rejection operation item for the second cellular phone to the user without providing the transfer operation item for the first cellular phone to the user when the first cellular phone, which is connected with the connection section using the handsfree communication protocol, is in the handset communicating state and the second cellular phone, which is connected with the connection section using the handsfree communication protocol, is in the incoming call receiving state.

* * * * *